(12) United States Patent
Dawnay et al.

(10) Patent No.: US 6,584,239 B1
(45) Date of Patent: Jun. 24, 2003

(54) ELECTRO OPTIC MODULATOR

(75) Inventors: Emma Jane Clarissa Dawnay, Didcot (GB); Arnold Peter Roscoe Harpin, Oxford (GB); Ian Edward Day, Oxford (GB)

(73) Assignee: Bookham Technology plc, Oxfordshire (GB)

( * ) Notice: Subject to any disclaimer, the term of this patent is extended or adjusted under 35 U.S.C. 154(b) by 0 days.

(21) Appl. No.: 09/655,401

(22) Filed: Sep. 5, 2000

Related U.S. Application Data

(60) Continuation-in-part of application No. 09/306,439, filed on May 6, 1999, now abandoned, which is a continuation-in-part of application No. 09/083,395, filed on May 22, 1998, now Pat. No. 5,908,305, which is a division of application No. 08/617,810, filed as application No. PCT/GB93/01983 on Mar. 20, 1996, now Pat. No. 5,757,986.

(30) Foreign Application Priority Data

Aug. 13, 1998 (GB) .............................................. 9817555

(51) Int. Cl.⁷ .............................................. G02F 1/035
(52) U.S. Cl. .............................. 385/2; 385/1; 385/129
(58) Field of Search .......................... 385/1, 2, 40, 130, 385/131, 129; 257/21, 431, 432, 101, 102, 98, 80; 359/245, 248

(56) References Cited

U.S. PATENT DOCUMENTS

| | | | | |
|---|---|---|---|---|
| 4,787,691 A | * | 11/1988 | Lorenzo et al. | 257/80 |
| 4,872,744 A | * | 10/1989 | Abeles et al. | 257/189 |
| 4,940,446 A | | 7/1990 | Inui et al. | 385/2 |
| 5,125,065 A | | 6/1992 | Stoll et al. | 385/130 |
| 5,280,189 A | * | 1/1994 | Schuppert et al. | 257/184 |
| 5,757,986 A | * | 5/1998 | Crampton et al. | 385/131 |
| 5,982,958 A | | 11/1999 | Minowa et al. | 385/2 |
| 6,278,168 B1 | * | 8/2001 | Day | 257/431 |
| 6,298,177 B1 | * | 10/2001 | House | 385/3 |

FOREIGN PATENT DOCUMENTS

GB  2 265 252 A  9/1993

* cited by examiner

*Primary Examiner*—Akm E. Ullah
*Assistant Examiner*—Scott A Knauss
(74) *Attorney, Agent, or Firm*—Fleshner & Kim, LLP

(57) ABSTRACT

A doped slab region is described for use around a ridge waveguide, for controlling the refractive index of the waveguide material. Instead of simply diffusing dopant in from a surface of the slab region adjacent the waveguide, an area of the slab region is etched and dopant diffused in from a side face of the etched region. Thus, the dopant profile is established from a horizontal direction, allowing the profile to be controlled. A simple vertically uniform doping profile can thus be provided, leading to a vertically uniform current density, or an anisotropic wet etch can be applied after the initial etch to provide a profile which concentrates the current density at a selected height in the slab region.

23 Claims, 2 Drawing Sheets

ELECTRO OPTIC MODULATOR

This application is a Continuation-In-Part application (CIP) of Ser. No. 09/306,439, filed May 6, 1999, abandoned, which is a CIP Application of Ser. No. 09/083,395 filed May 22, 1998, now U.S. Pat. No. 5,908,305, issued Jun. 1, 1999, which is a Divisional Application of 08/617,810 filed Mar. 20, 1996 now U.S. Pat. No. 5,757,986, issued May 26, 1998, which was the National Stage of International Application No. PCT/GB93/01983, filed Mar. 20, 1996, whose entire disclosures are incorporated herein by reference.

TECHNICAL FIELD

This invention relates to electro optic modulators.

BACKGROUND ART

It is known to form p-i-n devices around ridge waveguide structures. A summary is shown in FIG. 1, where the ridge 10 is surrounded by a slab region 12, 14 on either side, together forming a single mode ridge waveguide. The device is protected with an oxide layer 16, in which openings 18, 20 are formed either side of the ridge 10. These regions are doped to form local p and n regions, thus creating a p-i-n diode across the waveguide. This can be used to manipulate the charge carrier concentration within the waveguide, thus controlling its refractive index. This can then be used to modulate a light beam passing through the waveguide. Alternatively, a n-i-n or p-i-p structure will be sufficiently conductive to provide a thermal phase modulator by controlling the refractive index through its temperature dependence. Such a structure is described in U.S. Pat. No. 5,757,986, which this application is a CIP application thereof and whose entire disclosure is incorporated herein by reference.

As illustrated, the device is a silicon-on-insulator structure in which the active components are formed over an insulating oxide layer 22 on a supporting silicon substrate 24.

The dopant in this arrangement is controlled to remain in the substrate region on either side of the waveguide so that the single mode light beam does not meet a doped region. This is because dopant elements tend to act as absorption sites for the light beam, leading to signal losses and local heating.

Dopant is added to such structures in a generally well-known manner, in which the surface of the silicon is exposed to a dopant containing gas. Areas which are not to be doped are covered with a protective layer of $SiO_2$. Dopant then travels through the silicon according to the diffusion equations, which stipulate that for a constant concentration of dopant at the surface, the dopant concentration within the silicon will decline exponentially with distance, but that, as time progresses, the rate of that decline with distance will fall. Effectively, this means that the concentration at any one point will increase with time.

A difficulty in manufacturing the structure shown in FIG. 1 is that the dopant profile is difficult to control, as a result of the above. It tends to adopt the shape 26 shown in FIG. 1, in which sideways diffusion takes place at the edges of the opening in the protective $SiO_2$ layer. The shape which results means that the current density and current path will vary across the vertical extent of the light mode. Ideally, the current density would be controlled to maximise the overlap between the electrical current and the optical mode.

It is possible to heat treat a doped region such as to drive the dopant into the slab region. A deeper dopant profile such as this might create would be preferable per se. However, this process will tend also to spread the dopant horizontally, with the result that the doped areas would then need to be more widely separated from the waveguide. This in turn is undesirable. The wider doped areas would also lead to a less preferred current density profile.

DISCLOSURE OF INVENTION

The present invention seeks to provide an electro optic device in which the dopant profile allows a more appropriate current density profile to be established during use.

In its first aspect, the present invention provides an electro-optic device comprising a ridge waveguide surrounded on either side by a slab region containing a doped region, thereby to form a conductive path across the waveguide, the doped region being bounded on at least two sides by a confining layer of a material different to the material of the slab region.

In its second aspect, the present invention provides an electro optic device comprising a ridge waveguide surrounded on either side by a slab region containing a doped region, the slab region defining a plane, thereby forming a conductive path across the waveguide, the doped region having a substantially uniform distribution in a direction perpendicular to said plane.

In a third aspect, the invention provides an electro optic device comprising a ridge waveguide surrounded on either side by a slab region containing dopant, the slab region defining a plane, thereby to form a conductive path across the waveguide, the dopant having been diffused into the slab region in a direction substantially perpendicular to said plane.

In a fourth aspect, the invention provides an electro optic device comprising a ridge waveguide surrounded on either side by a slab region containing dopant, thereby to form a conductive path across the waveguide, the dopant having been diffused into the slab region from a side surface of an etched region formed in the slab region.

The invention also relates to a method of forming an electro optic device comprising the steps of forming a ridge waveguide on a slab surface the slab surface defining a plane, etching a region of the slab surface on at least one side of the waveguide and applying a dopant to a side surface of the etched region thereby to introduce the dopant into the substrate in a direction substantially parallel to said plane.

It is possible to further etch the etched region with an anisotropic wet etchant. This will leave the etched region with internally relieved sides, a profile which will be transferred to the dopant profile. This can be used to tailor the conductive region, for example to provide a peak current density co-incident with the peak light intensity of the mode distribution.

Other preferred features of the invention will be apparent from the following description and the subsidiary claims of the specification.

BRIEF DESCRIPTION OF DRAWINGS

Embodiments of the present invention will now described, by way of example, with reference to the accompanying Figures, in which.

BEST MODE OF CARRYING OUT THE INVENTION

It should be noted that for convenience of description, terms such as "lateral", "vertical", "side", "top" etc. used in the specification refer to directions relative to a device in the orientation shown in the accompanying drawings. The terms should not, however, be interpreted as restricting the scope of the claimed invention which may in practice be used in any orientation.

Figure 1:
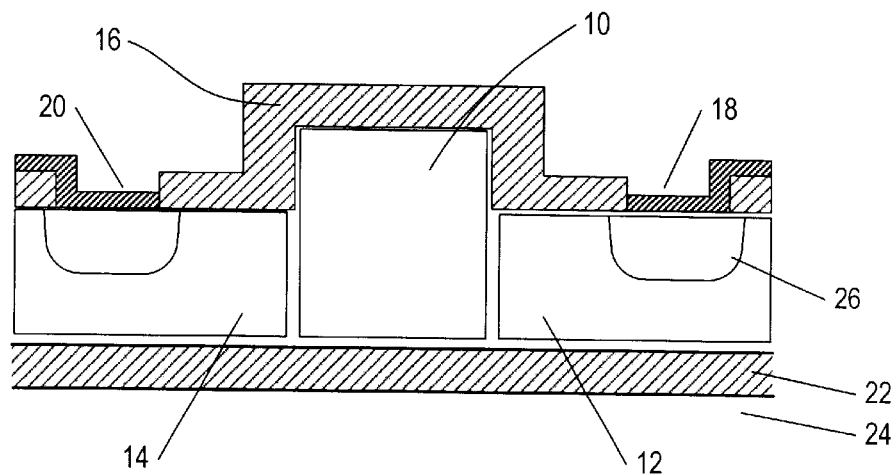
FIG. 1 is a cross section through a known electro optic device.

FIG. 1 has already been described in detail, and therefore no further description will be given here.

Figure 2:
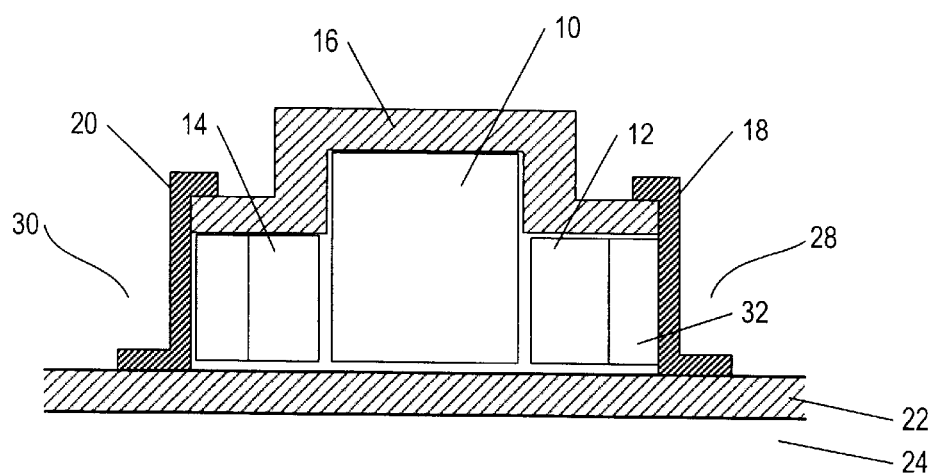
FIG. 2 is a cross section through an electro optic device according to a first embodiment of the present invention.

FIG. 2 shows a first embodiment of the present invention. As in FIG. 1, the device is a silicon-on-insulator device in which an oxide layer 22 lies between the active elements and an underlying silicon support 24. The ridge of the waveguide 10 is again flanked on either side by slab regions 12, 14, but these are now flanked by etched regions 28, 30 formed by an anistropic, directional dry etch. A protective oxide layer 16 covers the waveguide ridge 10 and the top surfaces of the slab regions 12, 14.

The slab regions are doped after formation of the etched regions by allowing a dopant to contact side surfaces of the etched sites. This then allows dopant to diffuse into the slab regions from the sides, across their complete depth. This differs from the example shown in FIG. 1, where the dopant diffuses in from an opening on the top surface and extends sideways beneath the protective layer either side of the opening. Thus, beneath the central area of the opening in this prior art, the dopant diffuses isotropically, giving a substantially flat, horizontal surface to the dopant profile as shown in FIG. 1. In contrast, the novel dopant delivery described herein gives rise to a doped volume substantially as shown at 32 (FIG. 2), ie one which is substantially uniform through the depth of the slab region 12, 14. In effect, the protective oxide layer 16 and the underlying oxide layer 22 serve to confine the diffusion of the dopant vertically and thereby preserve its linear profile. This means that the current density through the pin device thus formed will be controllable. In the embodiment of FIG. 2, the dopant profile will be substantially uniform in the vertical direction. This arrangement will therefore give a more uniform control of refractive index in the vicinity of the light signal.

Electrical contacts 18, 20 are then provided by depositing suitable material into the etched regions 28, 30 after doping.

Figure 3:
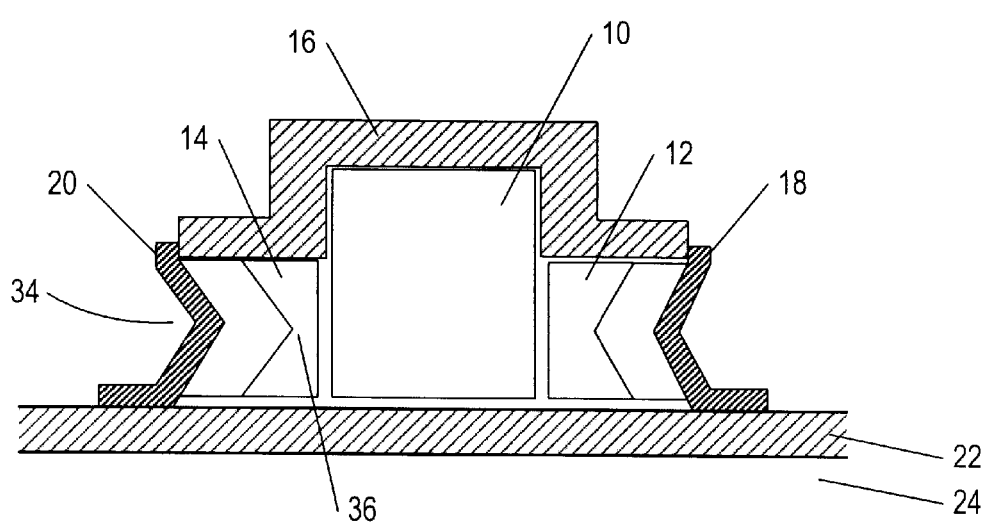
FIG. 3 is a cross section through an electro optic device according to a second embodiment of the present invention.

FIG. 3 shows an alternative arrangement. This is generally similar to the embodiment of FIG. 2, but differs in that after etching the regions 28, 30 either side of the slab regions 12, 14, an anisotropic wet etchant such as KOH is applied. As shown, it is applied to both sides of the device, which is preferable. This will give the etched side of the slab regions 12, 14 an undercut profile as shown at 34. When the dopant is applied, it will diffuse into the slab regions and retain the profile of the outer surface of the etched region, thus providing a "point" 36 to the dopant profile level with the undercut. The horizontal extent of the undercut and its vertical position can be controlled by the depth of the initial isotropic etch. A deep initial etch, e.g. through to the oxide layer 22, will lead to an undercut of greater horizontal extent and a lower position of the point 36. Whereas a shallow initial etch, i.e. not through to the oxide layer 22, will lead to an undercut of smaller horizontal extent but a higher position of the point 36. This alternative arrangement thus results in a current profile which is maximised at a controllable depth in the device. A similar effect could be obtained by only applying the anisotropic wet etch to one side, but this would be more difficult to carry out.

It is known that the mode of propagation of light signals in ridge waveguides such as illustrated is one in which the peak concentration of light energy is slightly below the surface of the substrate material. Thus, by controlling the current density to be a maximum at this point, it is possible to make most efficient use of the current by matching the current profile to the light energy profile.

The doping method described herein produces doped areas which have a substantially uniform horizontal thickness through the depth of the slab region. The doped areas also extend through the depth of the slab region but do not extend substantially into the waveguiding area.

Many variations could be made to the above-described embodiments without departing from the scope of the present invention. For example, similar constructions can be used to provide n-i-n and p-i-p devices, by suitable adjustment of the dopant elements. Alternatively (or in addition), electrical contact could be provided on the top surfaces of the doped areas. The regions 28, 30 can be left etched, subject to any necessary protective layers, or they can be filled with silicon, $SiO_2$, or other deposits.

What is claimed is:

1. An electro-optic device comprising a ridge waveguide formed on a slab region extending to either side thereof and containing a doped region, the slab region defining a plane, thereby to form a conductive path across the waveguide, the doped region being bounded on at least two sides by confining layers of oxide, the confining layers being of different material to the slab region, wherein the doped region extends from one of said confining layers of oxide to another of said confining layers of oxide throughout the depth of the slab region in a direction substantially perpendicular to said plane.

2. An electro-optic device according to claim 1 wherein the different material is $SiO_2$.

3. An electro-optic device according to claim 1 in which the waveguide is of silicon.

4. An electro-optic device according to claim 1 being formed as a silicon-on-insulator device.

5. An electro-optic device according to claim 1 including a contacts having an electrical connection with the doped region, the contacts being provided on a side face of the slab region.

6. An electro-optic device comprising a ridge waveguide formed on a slab region extending to either side thereof and containing a doped region, the slab region defining a plane, thereby to form a conductive path across the waveguide, wherein the doped region is bounded on at least two sides by confining layers of oxide, has a substantially uniform distribution in a direction perpendicular to said plane and extends from one of said confining layers of oxide to another of said confining layers of oxide throughout the depth of the slab region in a direction substantially perpendicular to said plane.

7. An electro-optic device according to claim 6 in which the waveguide is of silicon.

8. An electro-optic device according to claim 6 being formed as a silicon-on-insulator device.

9. An electro-optic device according to claim 6 including a contacts having an electrical connection with the doped region, the contacts being provided on a side face of the slab region.

10. An electro-optic device comprising a ridge waveguide formed on a slab region extending to either side thereof and containing dopant, the slab region defining a plane, thereby to form a conductive path across the waveguide, wherein the dopant is bounded on at least two sides by confining layers of oxide, is diffused into the slab region in a direction substantially parallel to said plane, and extends from one of said confining layers of oxide to another of said confining layers of oxide throughout the depth of the slab region in a direction substantially perpendicular to said plane.

11. An electro-optic device according to claim 10 in which the waveguide is of silicon.

12. An electro-optic device according to claim 10 being formed as a silicon-on-insulator device.

13. An electro-optic device according to claim 10 including a contacts having an electrical connection with a part of the slab region containing the dopant, the contacts being provided on a side face of the slab region.

14. An electro-optic device comprising a ridge waveguide formed on a slab region extending to either side thereof and containing dopant, the slab region defining a plane, thereby to form a conductive path across the waveguide, wherein the dopant is bounded on at least two sides by confining layers of oxide, is diffused into the slab region from a side surface of an etched region formed in the slab region, and extends from one of said confining layers of oxide to another of said confining layers of oxide throughout the depth of the slab region in a direction substantially perpendicular to said plane.

15. An electro-optic device according to claim 14 wherein the etched region is filled with one of silicon and $SiO_2$ prior to doping.

16. An electro-optic device according to claim 14 in which the waveguide is of silicon.

17. An electro-optic device according to claim 14 being formed as a silicon-on-insulator device.

18. An electro-optic device according to claim 14 including a contacts having an electrical connection with a part of the slab region containing dopant, the contacts being provided on a side face of the slab region.

19. An electro-optic device comprising a ridge waveguide formed integrally with a slab region of the same material, the slab region extending to either side of the ridge waveguide and containing a doped region, the slab region defining a plane, thereby to form a conductive path across the waveguide, the doped region being bounded on at least two sides by confining layers of oxide, the confining layers being of a different material to the ridge waveguide, wherein the doped region extends from one of said confining layer of oxide to another of said confining layers of oxide throughout the depth of the slab region in a direction substantially perpendicular to said plane.

20. A method of forming an electro-optic device comprising the steps of forming a ridge waveguide on a slab surface, the surface defining a plane, etching a region on at least one side of the waveguide and applying a dopant to that etched region thereby to introduce the dopant in a direction substantially parallel to said plane, such that the dopant extends from a first confining layer to a second confining layer throughout the depth of the slab in a direction substantially perpendicular to said plane.

21. A method according to claim 20 wherein a further etch, being an anisotropic wet etch, is performed prior to application of the dopant to form an undercut profile in a side surface of the etched region.

22. A method according to claim 21 in which the position of the undercut profile in a direction perpendicular to said plane is controlled by controlling the depth of the etched region etched on at least the one side of the waveguide.

23. An electro-optic device comprising a ridge waveguide with a slab region on both sides thereof, the slab region defining a plane, dopant being provided in the slab region on both sides of the waveguide to enable an electrical signal to be applied across the waveguide, wherein an etched region is formed in the slab region on both sides of the waveguide and wherein dopant is introduced into the slab region from a side surface of each of the etched regions such that the dopant extends from a first confining layer on one side of the dopant to a second confining layer on another side of the dopant throughout the depth of the slab region in a direction substantially perpendicular to said plane.

* * * * *